Nov. 12, 1929.   P. L. YOUNG   1,735,486
PROCESS FOR THE TREATMENT OF HYDROCARBONS
Filed Aug. 4, 1928
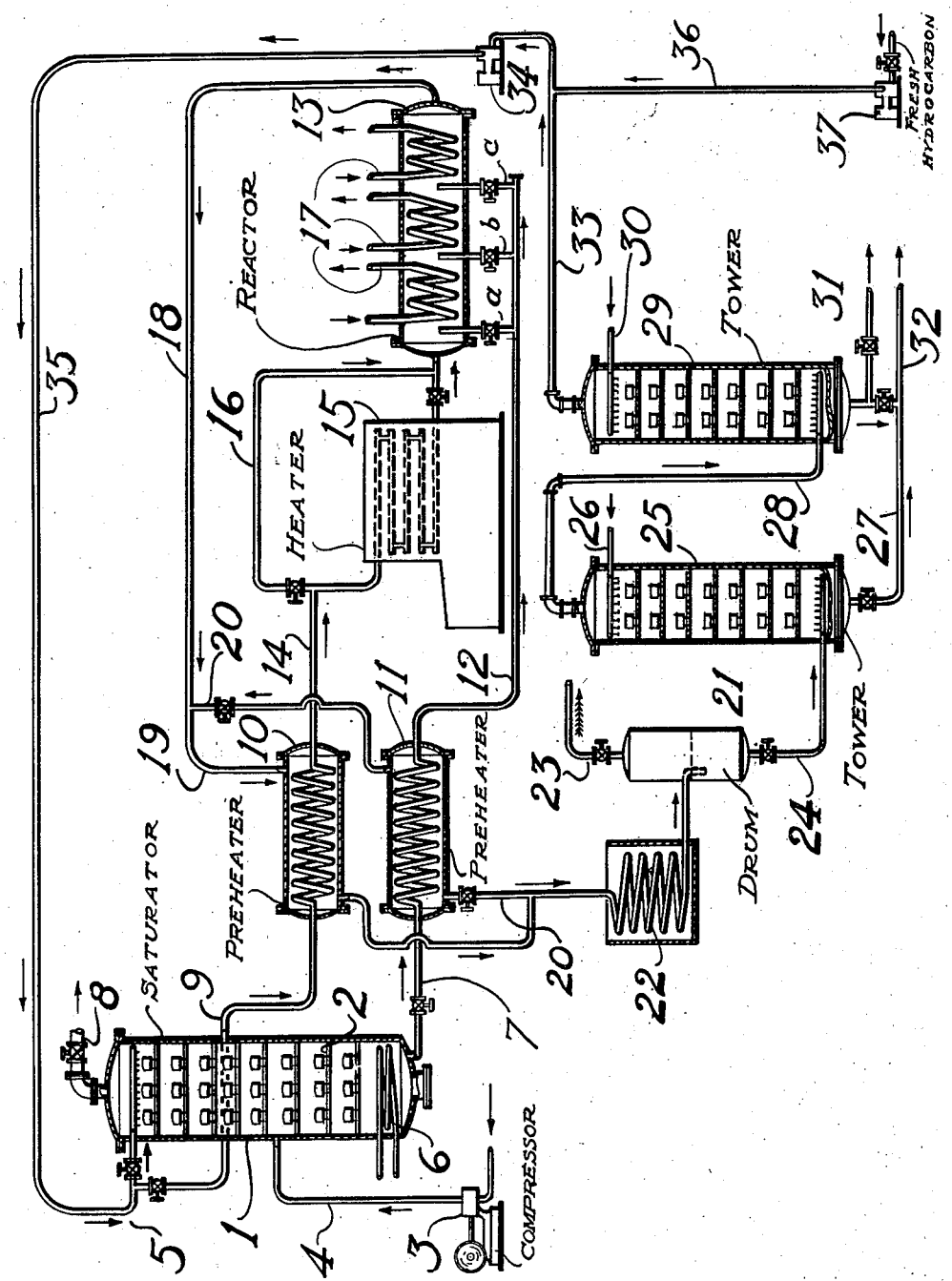
PHILIP L YOUNG Inventor
By his Attorney Patented Nov. 12, 1929

1,735,486

UNITED STATES PATENT OFFICE

PHILIP L. YOUNG, OF ELIZABETH, NEW JERSEY, ASSIGNOR TO STANDARD OIL DEVELOPMENT COMPANY, A CORPORATION OF DELAWARE

PROCESS FOR THE TREATMENT OF HYDROCARBONS

Application filed August 4, 1928. Serial No. 297,428.

The present invention relates to the art of treating hydrocarbons and more particularly comprises an improved method for treating hydrocarbons with free oxygen, whereby valuable oxygen-containing derivatives are obtained. The process will be fully understood from the following description and the drawing which illustrates one suitable form of apparatus.

The drawing is a semi-diagrammatic view in sectional elevation of an apparatus constructed in accordance with the present invention and indicates the flow of material.

A previous application Serial No. 190,728 filed May 12, 1927, in the names of W. K. Lewis and Per K. Frolich discloses a method for obtaining valuable liquid oxygen-containing derivatives from hydrocarbons and hydrocarbon mixtures by direct oxidation under high pressure with air or other gases containing free oxygen. The present invention comprises an improved method for carrying out the process.

Referring to the drawing, numeral 1 denotes a saturator preferably constructed in the form of an absorption tower with bell cap plates 2. Air or a gas rich in oxygen is forced under high pressure into the saturator by compressor 3 and pipe 4. Liquid or liquefied hydrocarbons are forced into the top of the saturator by line 5 and in flowing to the base of the tower absorbs the oxygen in preference to nitrogen. The lower end of the saturator may be heated by coil 6 to limit the solubility of nitrogen in the oil which is withdrawn by line 7. Undissolved gas is withdrawn from the top of the saturator by line 8.

Only a part of the hydrocarbon feed passes through the tower 1, a second portion being diverted from line 5 by a branch 9 and the two streams, the one free of oxygen and the other containing dissolved oxygen, are passed separately to preheaters 10 and 11, respectively. The hydrocarbon containing free oxygen flows directly by pipe 12 to reactor 13 in which the oxidation takes place and enters the reactor by branch pipes $a$, $b$, and $c$, or if preferred, it may enter by one of the pipes only. The oil which does not contain oxygen is passed from preheater 10 by line 14 to a heater 15 and thence to the reactor. Part of the hydrocarbon may be shunted around heater 15 by line 16 for ease in temperature regulation and the lines are suitable fitted with valves to control the flow.

Reactor 13 may be constructed in any particular design and is preferably fitted with temperature regulating coils 17 through which a medium may be passed to maintain temperature at the desired level. The reactor may contain a catalyst of the nature disclosed in the above noted application or may be empty.

Reaction products are conducted by lines 18, 19, and 20 to the preheater 10 and 11 for preheating the incoming materials and the cooled reaction products are discharged into a separator drum 21 after passing through a cooler 22. Gas may be removed by line 23 and the liquid conducted to a separation system by line 24.

Separation of hydrocarbon from the oxidized products may be accomplished in any preferred manner, such as distillation, but it is preferable to separate by use of solvents for the oxidized products. The mixture of hydrocarbon and oxygen-containing derivatives is forced into the base of tower 25 and a suitable solvent, which is not miscible with hydrocarbons to any appreciable extent, is forced into the upper part through line 26. The solvent has greater density than the hydrocarbon and in working its way to the base of tower 25 dissolves a large share of the oxygen-containing derivatives. The solution is removed to storage (not shown) by line 27. The hydrocarbon is then preferably washed in tower 29 with water which enters by pipe 30 and is removed to storage (not shown) by pipe 31.

The hydrocarbon, which has not been oxidized, may be recirculated to line 5 by passage through lines 33, 35 and pump 34. Fresh hydrocarbon is added by line 36 and pump 37.

In the operation of the process, a part of the hydrocarbon to be oxidized is saturated with oxygen which may be derived from a source of pure oxygen or air, enriched air, or, indeed, from any gas rich in free oxygen. The saturation is carried out under high pressure and it is preferred to dissolve oxygen to the limit of its solubility under the conditions maintained in the saturator and to provide a proportion of oxygen in the reactor up to about 15 mol % of the total hydrocarbon being treated. Less than 10 mol % or even less than 5 mol % of oxygen is sometimes desirable since higher proportions of oxygen cause greater loss in the form of CO and $CO_2$. The solution of oxygen in liquid or liquefied hydrocarbon may be preheated but the temperature should not be raised to a point where reaction takes place. Ordinarily, it may be heated to about 150° C. but preferably not over about 200° C. The oxygen-free hydrocarbon, however, may be heated to any degree short of where thermal decomposition takes place and the two streams are united in the reactor. In this manner the time of reaction may be carefully and accurately controlled which is of importance in the formation of oxygen-containing derivities, particularly alcohols.

The reaction is carried out, as disclosed in the previously noted application, under pressure in substantial excess of atmospheric, for example above 100 pounds per square inch although pressures in the neighborhood of 1000–3500 pounds per square inch are preferable. The rate of passage of the mixture through the reactor should be rapid and temperature should be controlled against large variations. The temperature is ordinarily between approximate limits of 200 and 600° C. and it preferably approaches the lower limit of the range for the higher molecular weight hydrocarbons. When the oxygen concentration is low, and especially in small units, coils 17 may be used to supply the heat lost by radiation but I prefer to operate in such a manner and with such concentration of oxygen that heat must be abstracted by coil 17.

If desired, the oxygen-containing hydrocarbon may be fed at a plurality of points in the reactor which may be in the form of a drum as shown, or in the form of a continuous coil.

Pure hydrocarbons are suitable for my process of mixtures or hydrocarbons although I prefer to use closely boiling fractions. Pure hydrocarbons such as methane, ethane, propane, and the like to hexane have been used in my process and mixtures such as are obtained from natural gas or refinery gas and also higher boiling mixtures such as gasoline, kerosene and heavier hydrocarbons may be treated, as will be understood.

The present invention is not to be limited by any theory of the mechanism of the process nor by any example given merely by way of illustration but only by the following claims in which it is desired to claim all novelty inherent in the process.

I claim:

1. In the process for obtaining liquid oxygen-containing derivatives from hydrocarbons by direct oxidation, the steps of passing a relatively cool mixture, comprising hydrocarbon and oxygen, into a zone of reaction, forcing heated hydrocarbon into said zone, whereby the mixture of oxygen and hydrocarbon is raised to a temperature at which reaction takes place and withdrawing the products of the reaction.

2. A process according to claim 1, in which the mixture of hydrocarbon and oxygen is prepared by dissolving a gas rich in oxygen in hydrocarbon while in a liquid state.

3. A process according to claim 1, in which the mixture of hydrocarbon and oxygen is preheated to a temperature short of that at which reaction takes place.

4. A process according to claim 1, in which the mixture of oxygen and hydrocarbon is added to the zone of reaction at a plurality of points.

5. A process according to claim 1, in which the mixture of hydrocarbon and oxygen is preheated but not in excess of 200° C.

6. Process according to claim 1, in which the oxygen-hydrocarbon mixture is preheated but not in excess of 200° C. and the oxygen-free hydrocarbon is heated to a point below that at which substantial thermal decomposition takes place.

PHILIP L. YOUNG.